US011428179B1

(12) United States Patent
Kurtz et al.

(10) Patent No.: US 11,428,179 B1
(45) Date of Patent: Aug. 30, 2022

(54) SYSTEMS AND METHODS FOR FUEL POST INJECTION TIMING

(71) Applicant: Ford Global Technologies, LLC, Dearborn, MI (US)

(72) Inventors: Eric Kurtz, Dearborn, MI (US); Michiel J. Van Nieuwstadt, Ann Arbor, MI (US); Jason Martz, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/190,712

(22) Filed: Mar. 3, 2021

(51) Int. Cl.

| | |
|---|---|
| ***B60T 7/12*** | (2006.01) |
| ***F02D 41/02*** | (2006.01) |
| ***F02D 41/40*** | (2006.01) |
| ***F02D 41/00*** | (2006.01) |
| ***F01N 3/023*** | (2006.01) |
| ***F02D 13/06*** | (2006.01) |
| ***F02B 37/24*** | (2006.01) |
| ***F02D 13/04*** | (2006.01) |
| ***F02D 13/02*** | (2006.01) |

(52) U.S. Cl.
CPC ........... *F02D 41/027* (2013.01); *F01N 3/023* (2013.01); *F02B 37/24* (2013.01); *F02D 13/0215* (2013.01); *F02D 13/04* (2013.01); *F02D 13/06* (2013.01); *F02D 41/0002* (2013.01); *F02D 41/009* (2013.01); *F02D 41/0077* (2013.01); *F02D 41/405* (2013.01)

(58) Field of Classification Search
CPC .... F02D 41/042; F02D 41/26; F02D 41/3005; F02D 37/02; F02B 2075/027
See application file for complete search history.

(56) References Cited

U.S. PATENT DOCUMENTS

| | | | |
|---|---|---|---|
| 5,816,216 | A | 10/1998 | Egashira et al. |
| 6,666,020 | B2 | 12/2003 | Tonetti et al. |
| 6,931,842 | B2 | 8/2005 | Ohtake et al. |
| 7,594,493 | B2 | 9/2009 | Matekunas et al. |
| 8,272,207 | B2 | 9/2012 | Kurtz |

(Continued)

FOREIGN PATENT DOCUMENTS

| | | |
|---|---|---|
| CN | 107771242 A | 3/2018 |
| KR | 980009815 A | 4/1998 |

*Primary Examiner* — John Kwon
(74) *Attorney, Agent, or Firm* — Vincent Mastrogiacomo; McCoy Russell LLP

(57) ABSTRACT

Methods and systems are provided for fuel post injection for diesel particulate filter (DPF) regeneration. In one example, a method may include, responsive to a request for generating exotherms in an exhaust system of an engine while combustion is discontinued in at least one cylinder of the engine, injecting fuel into a cylinder within a threshold crank angle range around top dead center (TDC) of a compression stroke of the cylinder and also within the threshold crank angle range around top dead center of an exhaust stroke of the cylinder, the threshold crank angle range extending from no more than 40 crank angle degrees before TDC to no more than 40 crank angle degrees after TDC. In this way, fuel post injections may be injected +/−40 crank angle degrees after TDC of the compression and exhaust strokes to increase exhaust temperature while avoiding wall wetting and oil-in-fuel dilution.

9 Claims, 7 Drawing Sheets

(56) References Cited

U.S. PATENT DOCUMENTS

| | | | | |
|---|---|---|---|---|
| 9,382,857 | B2 | 7/2016 | Glugla et al. | |
| 10,508,613 | B2 * | 12/2019 | Narahara | F02D 41/401 |
| 2002/0026924 | A1 * | 3/2002 | Morikawa | F02D 13/0219<br>123/305 |
| 2007/0000238 | A1 | 1/2007 | Marlett et al. | |
| 2007/0137179 | A1 * | 6/2007 | Kondou | F02D 41/047<br>123/27 R |
| 2008/0091328 | A1 * | 4/2008 | Tabata | F02D 9/00<br>701/102 |
| 2011/0023454 | A1 * | 2/2011 | Kurtz | F02D 41/029<br>60/274 |
| 2015/0167576 | A1 | 6/2015 | Glugla et al. | |
| 2017/0138286 | A1 * | 5/2017 | Kojima | F02P 5/1504 |
| 2017/0241361 | A1 * | 8/2017 | Nakasaka | F02D 41/126 |

* cited by examiner

SYSTEMS AND METHODS FOR FUEL POST INJECTION TIMING

FIELD

The present description relates generally to methods and systems for controlling fuel post injection timing in a vehicle engine during diesel particulate filter regeneration.

BACKGROUND/SUMMARY

Combustion in an engine of a vehicle using diesel or gasoline fuel may generate particulate matter (PM) (such as soot and aerosols) that can be exhausted to the atmosphere. Emission after-treatment devices may be used to treat exhaust gases before the exhaust gases leave the vehicle.

In particular, the emission after-treatment devices may include particulate filters, oxidation catalysts, and nitrogen oxide (NOx) catalysts. Particulate matter, which is largely made up of carbon particles from incomplete combustion, may be collected in particulate filters and may gradually restrict a flow of exhaust gas as the particulate matter accumulates in the particulate filters. In order to periodically regenerate or purge the particulate filter of particulate matter, measures may be taken that result in an increase of the exhaust gas temperature above a predetermined level (e.g., above 600 K) in order to incinerate the carbon particles accumulated in the filter.

In some cases, a particulate filter reaches high enough temperatures during normal vehicle operation to passively perform a particulate filter regeneration. However, some vehicles may not reach passive regeneration conditions (e.g., vehicle speeds above 40 mph), and the particulate filter may become fouled.

In some cases, the vehicle may perform active particulate filter regeneration based on an estimated soot load, for example. The estimated soot load may be based on an exhaust backpressure measured upstream of the particulate filter. The active particulate filter regeneration may include post combustion fuel injection, referred to herein as "post injection," which increases the temperature of the exhaust by producing exotherms. In some examples, the active particulate filter regeneration may occur while the vehicle slows down and combustion is discontinued. Air continues to be pumped by the engine, but a relatively small amount of fuel post injection may be provided. As a result, the exhaust system may cool off during the active regeneration, and the particulate filter may not be adequately emptied. As another example, the engine may be operated with one or more cylinders deactivated. The post injections may become larger as fewer cylinders are active, increasing a likelihood of wall wetting and fuel in-oil dilution.

Other attempts to increase exhaust gas temperatures for a diesel particulate filter (DPF) regeneration include a fuel post injection after a main fuel injection within cylinders of the engine. One example approach is shown by Tonetti et al. in U.S. Pat. No. 6,666,020 B2. Therein, to initiate regeneration in a DPF, a fuel injection strategy is performed in each cylinder in which a main fuel injection occurs followed by two fuel post injections.

However, the inventors herein have recognized potential issues with such systems. As one example, a fuel post injection strategy for cylinder deactivation or engine braking is not discussed, and without precise timing of the post injection and controlling the amount of fuel post injection, wall wetting and fuel in-oil dilution may still occur.

In one example, the issues described above may be addressed a method, comprising responsive to a request for generating exotherms in an exhaust system of an engine while combustion is discontinued in at least one cylinder of the engine, injecting fuel into a cylinder within a threshold crank angle range around top dead center of a compression stroke of the cylinder and also within the threshold crank angle range around top dead center of an exhaust stroke of the cylinder, the threshold crank angle range extending from no more than 40 crank angle degrees before top dead center to no more than 40 crank angle degrees after top dead center. In this way, fuel post injection may be used to create exotherms in a diesel oxidation catalyst (DOC) for DPF regeneration while reducing oil-in-fuel dilution and bore washing within the cylinder.

As one example, the request for generating the exotherms in the exhaust system of the engine may be responsive to a soot load of a particulate filter positioned in the exhaust system of the engine being greater than a threshold soot load, and the method may further include adjusting an air flow through the engine responsive to the request for generating the exotherms in the exhaust system of the engine. In some examples, injecting fuel into the cylinder within the threshold crank angle range around top dead center of the compression stroke of the cylinder and also within the threshold crank angle range around top dead center of the exhaust stroke of the cylinder may include determining an amount of fuel to inject based on the adjusted air flow through the engine, determining a first timing for injecting the fuel within the threshold crank angle range around top dead center of the compression stroke, determining a second timing for injecting the fuel within the threshold crank angle range around top dead center of the exhaust stroke, and injecting the determined amount of fuel at the first timing and the second timing. The first timing and the second timing may each be determined based on desired exhaust gas properties. For example, the first timing and the second timing may be earlier within the threshold crank angle range responsive to increased mixing being desired relative to a reduced ignition of the fuel, and the second timing to be later within the threshold crank angle range responsive to the reduced ignition of the fuel being more desired than the increased mixing. Further, an exhaust gas recirculation (EGR) valve of the engine may be fully closed to prevent recirculation of the injected fuel.

In some examples, the air flow may be adjusted by adjusting a vane position of a variable geometry turbine. Additionally or alternatively, the air flow through the engine may be adjusted by operating a decompression device. The decompression device may be a continuously variable valve lift (CVVL) system, and operating the decompression device may include adjusting an exhaust valve opening timing or an intake valve opening timing, for example. In such an example, combustion may be discontinued in the at least one cylinder of the engine responsive to an engine braking condition. In other examples, combustion may be discontinued in the at least one cylinder of the engine responsive to a cylinder deactivation condition, and adjusting the air flow through the engine may include maintaining an exhaust valve of each deactivated cylinder open.

By injecting the fuel post injection within the threshold crank angle range, mixing of the fuel post injection with the air within the cylinder may be increased. As such, when the fuel post injection reaches an oxidation catalyst positioned in the exhaust system upstream of the particulate filter, an increased amount of exotherms may be created to increase the temperature of the particulate filter. Additionally, with increasing the air and fuel mixing and basing the amount of fuel post injection on the amount of air flow through the cylinder, oil-in-fuel dilution and bore washing may be reduced or avoided. As a result, particulate filter regeneration may occur with reduced fuel usage even during exhaust cooling events such as cylinder deactivation and engine braking.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
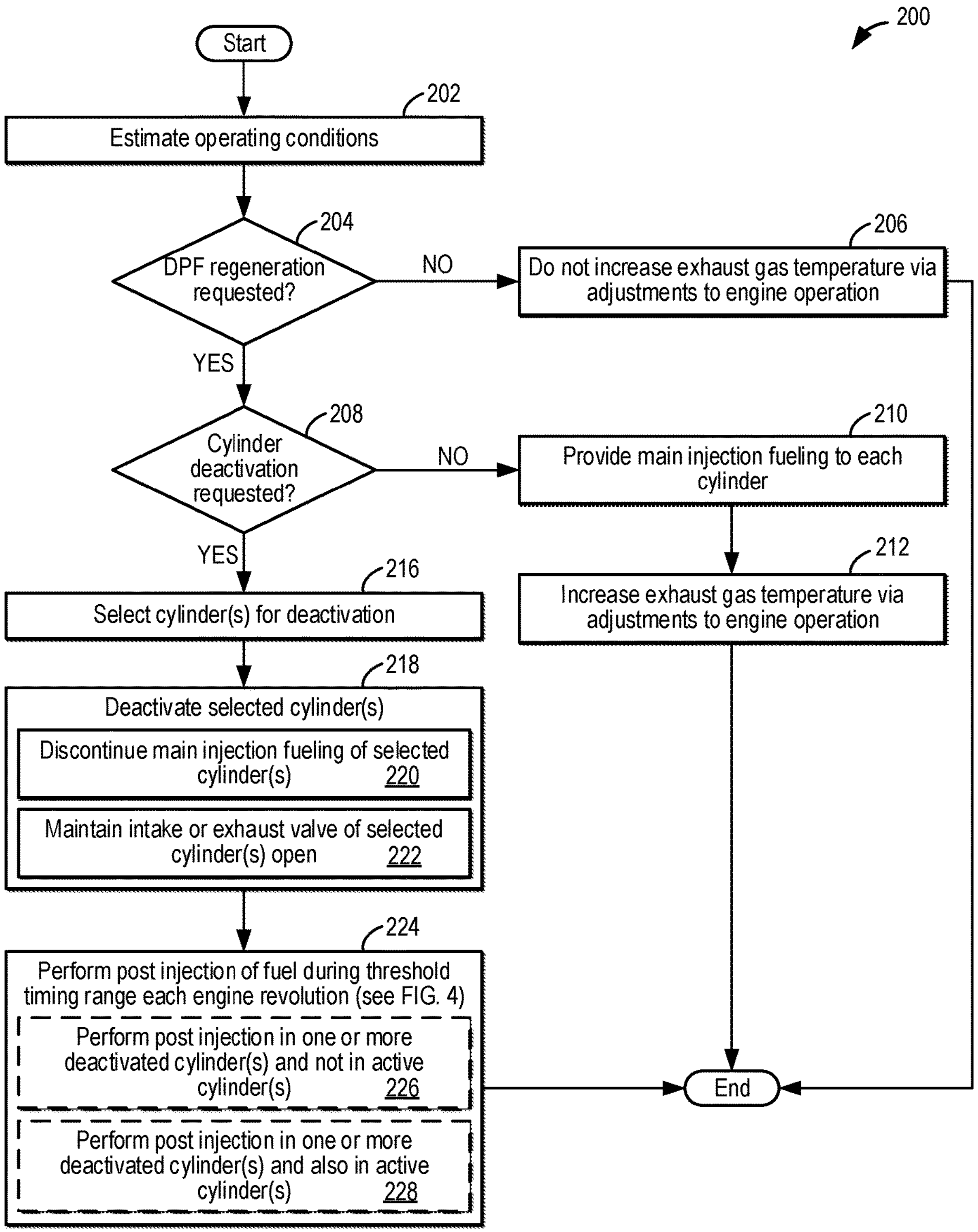
FIG. 2 shows a method for diesel particulate filter (DPF) regeneration during a cylinder deactivation event.
Figure 3:
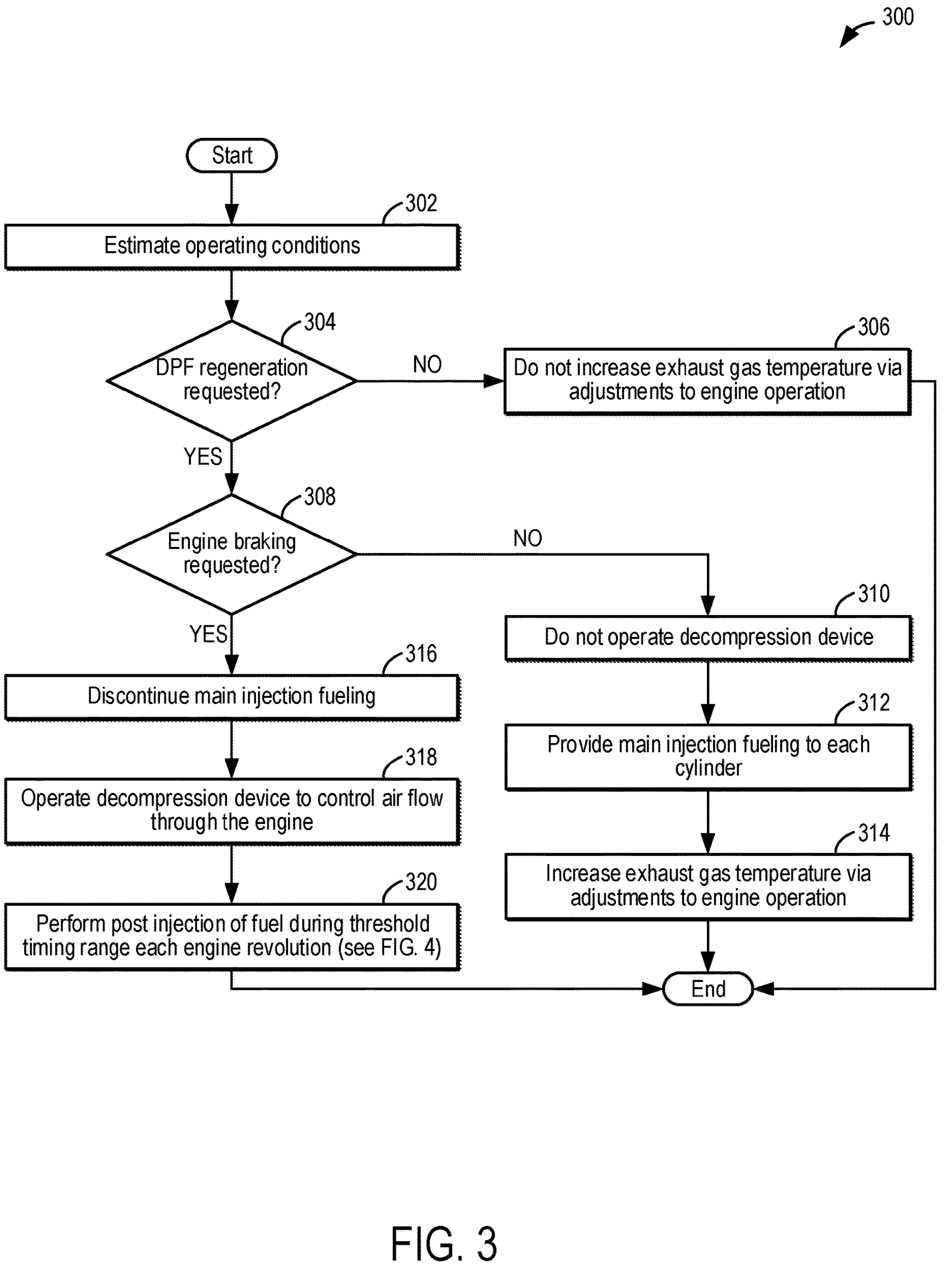
FIG. 3 shows a method for DPF regeneration during an engine braking event.
Figure 5:
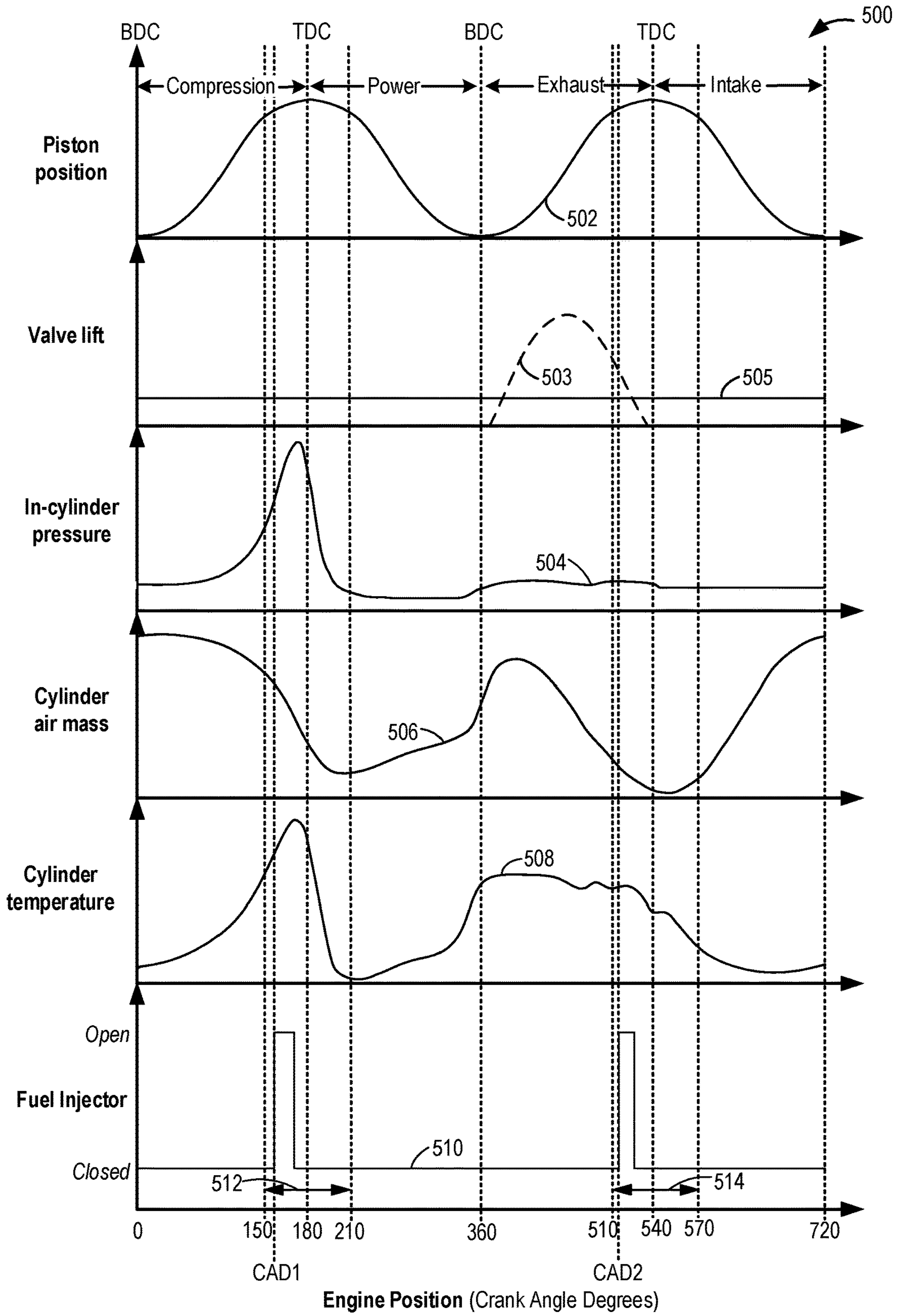
FIG. 5 displays a first example timing chart for increased mixing of air with fuel from a fuel post injection during DPF regeneration by injecting a fuel post injection earlier within a threshold timing range.
Figure 6:
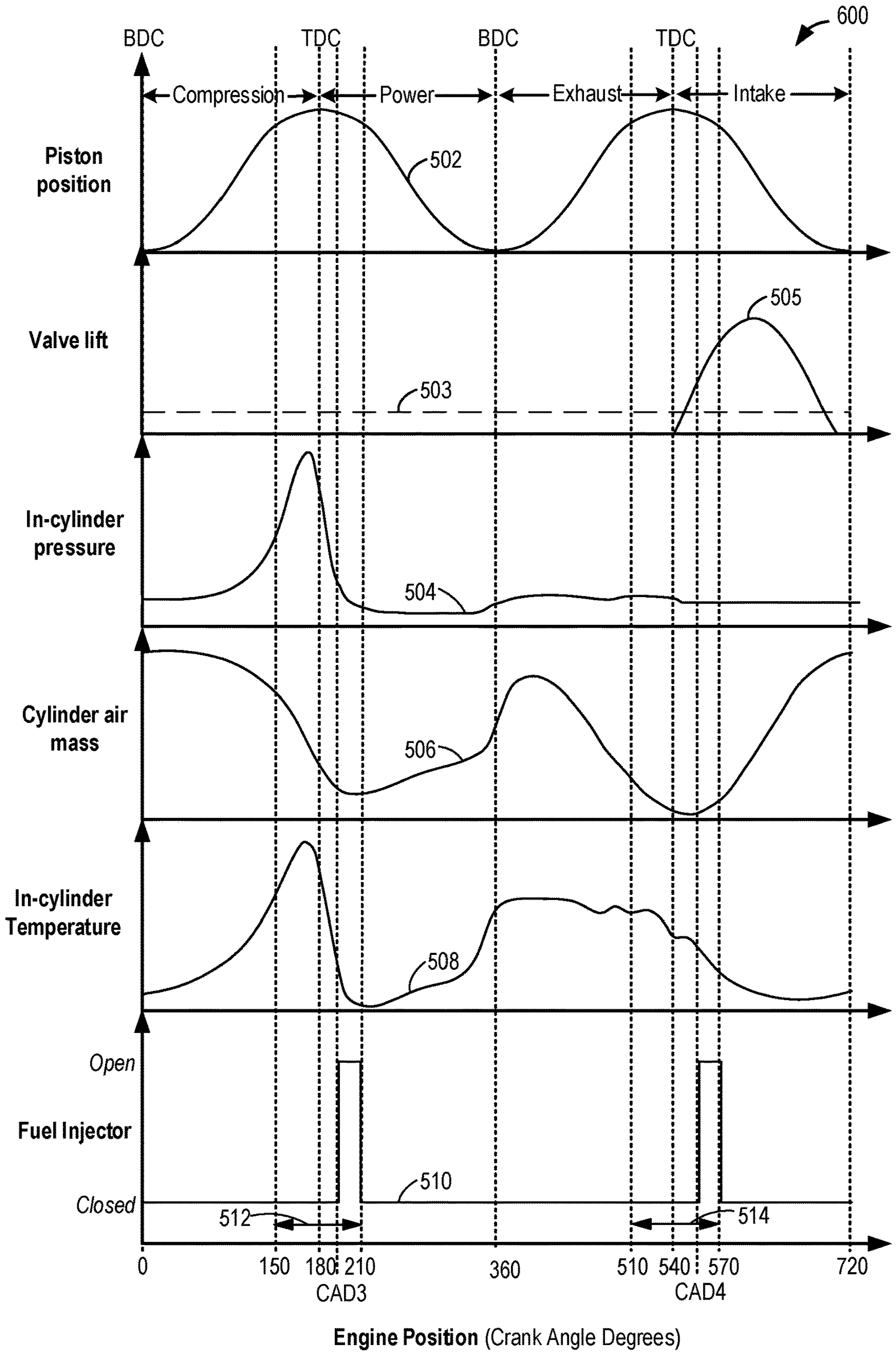
FIG. 6 displays a second example timing chart for decreasing a probability of fuel from a fuel post injection igniting during DPF regeneration by injecting the fuel post injection later within the threshold timing range.
Figure 7:
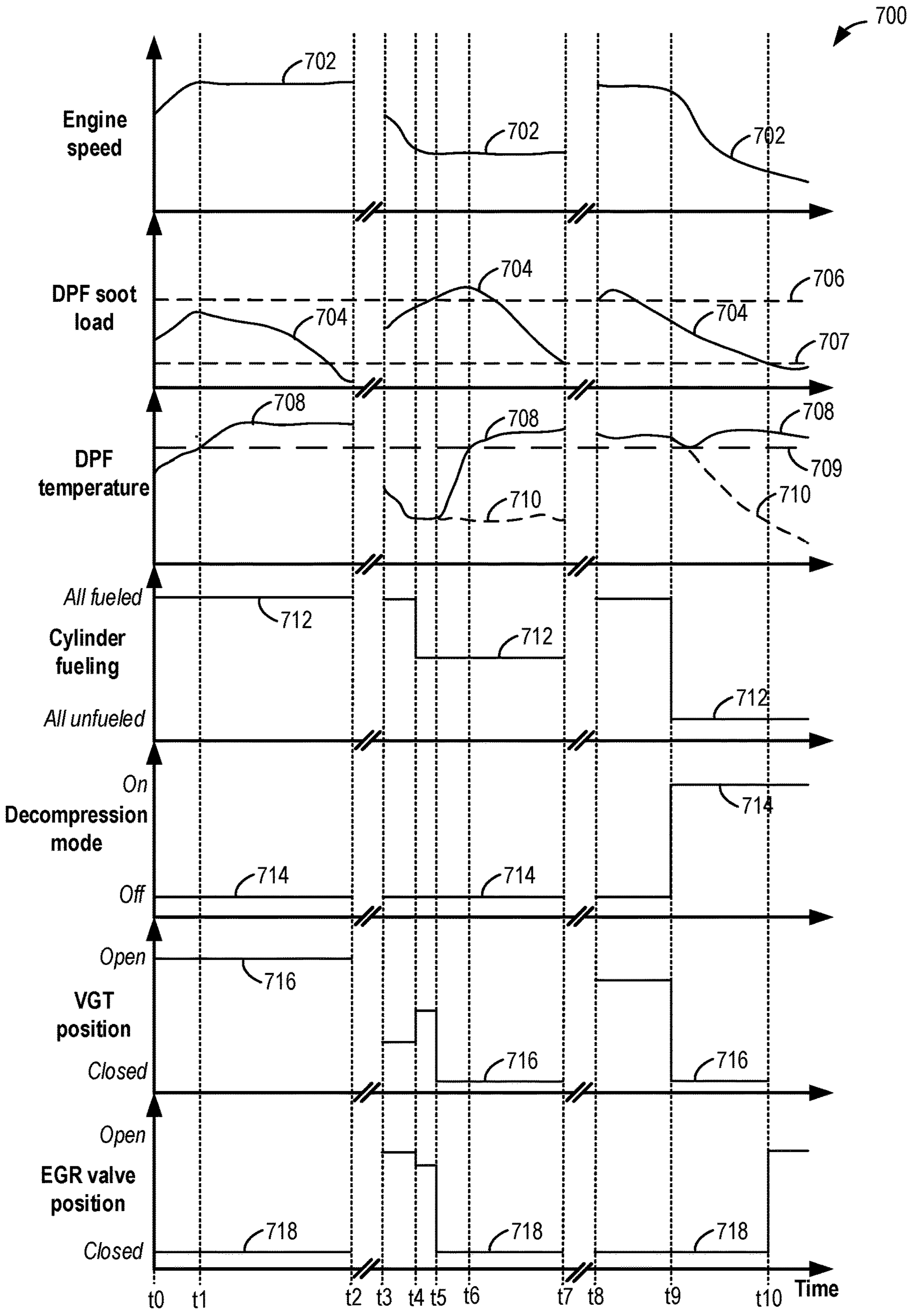
FIG. 7 displays an example timeline of adjustments to engine operating parameters for DPF regeneration.

The following description relates to systems and methods for fuel post injection during diesel particulate filter regeneration. Fuel post injection may occur in an engine, such as the engine schematically shown in FIG. 1, for example, which includes a diesel oxidation catalyst (DOC) and a diesel particulate filter (DPF) to reduce emissions from the engine. In some examples, DPF regeneration may occur while one or more cylinders are deactivated, which may cause a temperature of the DPF to decrease. A method for DPF regeneration during cylinder deactivation is shown in FIG. 2, while a method for DPF regeneration during engine braking is shown in FIG. 3. In each example, the fuel post injection may be precisely timed in order to increase an amount of heat produced via the post injection and/or increase mixing of air and fuel while also decreasing wall wetting, such as according to the method shown in FIG. 4. A first example timing chart for performing the fuel post injection is shown in FIG. 5, with the post injection occurring while the air within the cylinder is at the highest temperature in order to increase mixing of air and the post injected fuel by enhancing evaporation of the fuel with the hotter air. A second example timing chart is shown in FIG. 6, with the fuel post injection occurring while the air mass within the cylinder is increasing and at lower temperatures in order to decrease a probability of the fuel igniting prior to generating an exotherm for DPF regeneration. Additionally, a prophetic example timeline for adjusting operation of the engine during DPF regeneration is shown in FIG. 7. In this way, exhaust system cooling while combustion is discontinued in at least one engine cylinder (e.g., due to cylinder deactivation or engine braking) may be reduced, enabling effective and efficient DPF regeneration with reduced cylinder wall wetting.

Figure 1:
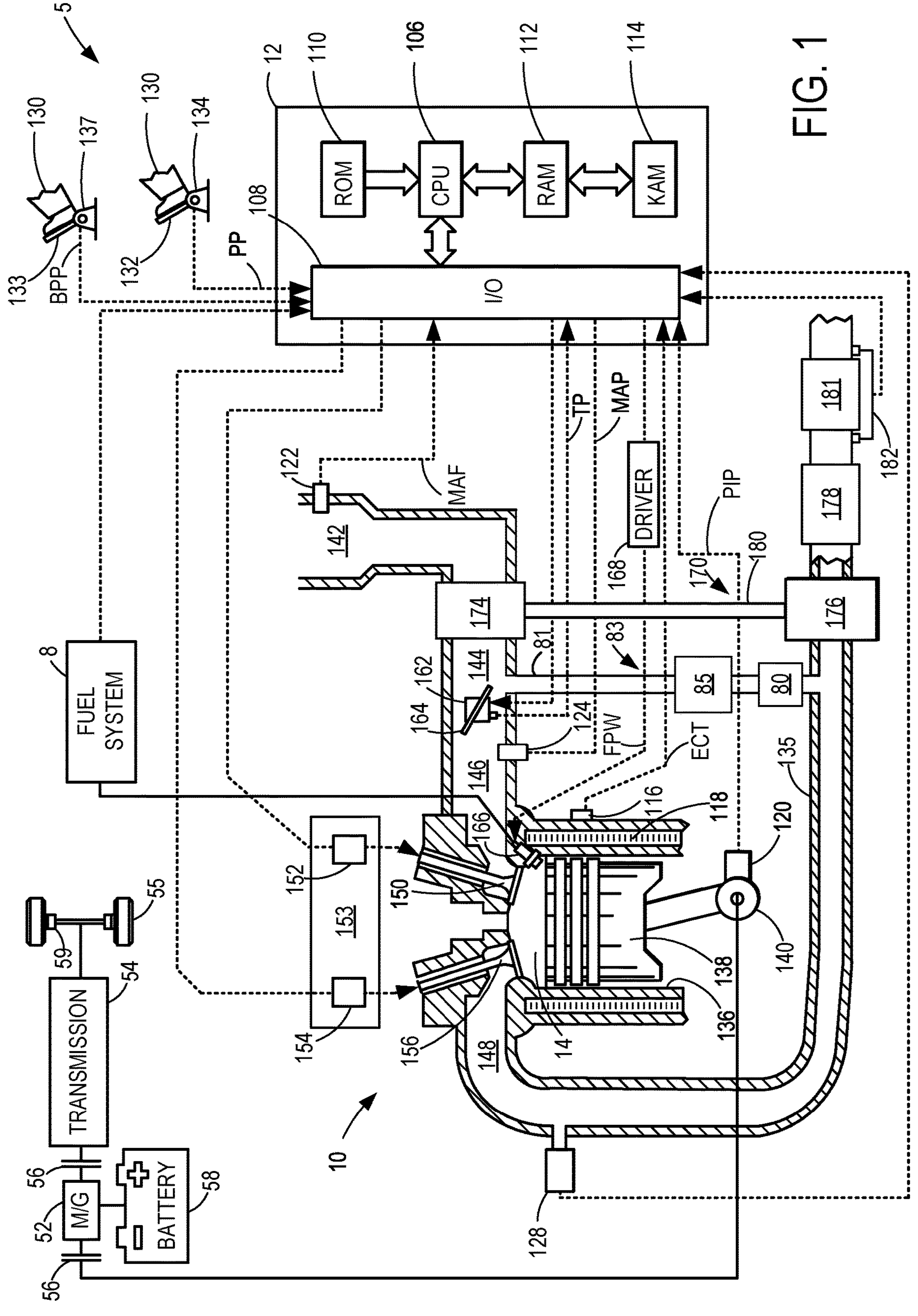
FIG. 1 schematically depicts an example cylinder of an internal combustion engine.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an accelerator pedal 132 and an accelerator pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Vehicle wheels 55 may include mechanical brakes 59 to slow the rotation of vehicle wheels 55. Mechanical brakes 59 may include friction brakes, such as disc brakes or drum brakes, or electromagnetic (e.g., electromagnetically-actuated) brakes, for example, both friction brakes and electromagnetic brakes configured to slow the rotation of vehicle wheels 55, and thus the linear motion of vehicle 5. As an example, mechanical brakes 59 may include a hydraulic brake system comprising brake calipers, a brake servo, and brake lines configured to carry brake fluid between the brake servo and the brake calipers. Mechanical brakes 59 may be configured such that a braking torque applied to wheels 55 by the brake system varies according to the pressure of brake fluid within the system, such as within the brake lines. Furthermore, vehicle operator 130 may depress a brake pedal 133 to control an amount of braking torque supplied by mechanical brakes 59, such as by controlling the pressure of brake fluid within the brake lines, to slow vehicle 5 and/or hold vehicle 5 stationary. For example, a brake pedal position sensor 137 may generate a proportional brake pedal position signal BPP, which may be used to determine the amount of braking torque requested by vehicle operator 130.

Cylinder 14 of engine 10 can receive intake air via a series of intake passages 142 and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger 170, including a compressor 174 arranged between intake passages 142 and 144 and an exhaust turbine 176 arranged along an exhaust passage 135. Compressor 174 may be at least partially powered by exhaust turbine 176 via a shaft 180. In examples where turbocharger 170 is a variable geometry turbocharger (VGT), an effective aspect ratio of exhaust turbine 176 may be varied.

In some examples, a throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164. However, in other examples, engine 10 may not include throttle 162.

An exhaust manifold 148 can receive exhaust gases from other cylinders of engine 10 in addition to cylinder 14. An exhaust gas sensor 128 is shown coupled to exhaust manifold 148 upstream of a plurality of emission control devices. Exhaust gas sensor 128 may be a temperature sensor positioned to measure a temperature of the exhaust gases. In the example shown, the plurality of emission control devices includes a diesel oxidation catalyst (DOC) 178 and a diesel particulate filter (DPF) 181. DOC 178 may be a stainless-steel canister that contains a honeycomb structure (to increase surface area within DOC 178) coated with catalytic metals such as platinum or palladium. When exhaust gases such as carbon monoxide or hydrocarbons touch the inner surfaces of DOC 178, the gases are oxidized and may produce water and small amounts of carbon dioxide. DPF 181 may be a ceramic filter with a honeycomb structure used to capture particulate matter (e.g., soot). After capturing soot, DPF 181 is heated up to high temperatures (e.g., around 600 Kelvin) by the exhaust gases to oxidize and burn the soot within DPF 181. The oxidation and burning of the soot from DPF 181 is an event herein referred to as regeneration. In some examples, additional emission control devices may be included in the plurality of emission control devices, such as a NOx trap and/or a selective catalytic reduction (SCR) system. Although exhaust gas sensor 128 is shown coupled upstream of DOC 178, in other examples, exhaust gas sensor 128 may be coupled between DOC 178 and DPF 181, downstream of DPF 181, or in one or more of the three locations.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown) and/or camshaft position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cylinder deactivation valve control (CDVC), cam profile switching (CPS), variable cam timing (VCT), variable valve timing (VVT), variable valve lift (VVL), and/or a continuous variable valve lift (CVVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system). Actuator 152 and/or actuator 154 may be included in a decompression device 153. In one example, decompression device 153 may be the CVVL system and may be used to control valve lift during engine braking, such as to release compressed gas from cylinder 14 by opening exhaust valve 156 near top dead center. In other examples, decompression device 153 may be another type of compression release engine brake, such as a Jacobs (e.g., Jake) brake.

As further described herein, intake valve 150 and/or exhaust valve 156 may be deactivated during selected conditions, such as when decreased torque demand is requested and one or more cylinders of engine 10 are operated unfueled. The number and identity of cylinders operated unfueled may be symmetrical or asymmetrical, such as by selectively discontinuing fueling to one or more cylinders on only a first engine bank, selectively discontinuing fueling to one or more cylinders on only a second engine bank, or selectively discontinuing fueling to one or more cylinders on each of the first and second engine banks. As another example, combustion may be discontinued in one or more cylinders of engine 10 during engine braking. In the case of engine braking, intake valve 150 and/or exhaust valve 156 may be adjusted by decompression device 153.

Cylinder 14 can have a compression ratio, which is a ratio of volumes when piston 138 is at bottom dead center (BDC) to top dead center (TDC). In one example, the compression ratio is in the range of 14:1 to 25:1. However, in some examples, such as where different fuels are used, the compression ratio may be increased.

In some examples, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse-width of signal FPW received from controller 12 via an electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such above the piston between intake valve 150 and exhaust valve 156. Alternatively, the injector may be located overhead and near the intake valve to increase mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternative embodiment, fuel injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by fuel injector 166 to the cylinder during a single cycle of the cylinder. Further, the distribution and/or relative amount of fuel delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof.

Fuel tanks in fuel system 8 may hold fuels of different fuel types, such as fuels with different fuel qualities and different fuel compositions. The differences may include different cetane numbers, different heats of vaporization, different fuel blends, different additives, and/or combinations thereof, etc. A few examples of different fuels includes diesel as a first fuel type, biodiesel as a second fuel type, and kerosene as a third type. Moreover, fuel characteristics of one or all fuel tanks may vary frequently, for example, due to day to day variations in tank refilling, and/or seasonally, such as due to different seasonal fuel blends. However, in an alternative embodiment, engine 10 is a gasoline engine, and the fuels held in fuel system 8 may include one or more gasoline blends.

External exhaust gas recirculation (EGR) may be provided to the engine via a high pressure EGR system 83, delivering exhaust gas from a zone of higher pressure in exhaust passage 135 to a zone of lower pressure in intake manifold 44, via an EGR passage 81. However, in other examples, EGR system 83 may be a low pressure EGR system, where EGR passage 81 is coupled between exhaust passage 135 downstream of turbine 176 and intake passage 142 upstream of compressor 174. In still other examples, both high pressure EGR and low pressure EGR loops may be included.

An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is maximally enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through an EGR cooler 85 within EGR passage 81. EGR cooler 85 may reject heat from the EGR gases to engine coolant, for example.

Under some conditions, EGR system 83 may be used to regulate a temperature of an air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate an EGR mass flow. EGR sensors may be arranged within EGR passage 81 and may provide an indication of one or more of mass flow, pressure, and temperature of the exhaust gas, for example. An amount of EGR requested may be based on engine operating conditions, including engine load (as estimated via accelerator pedal position sensor 134), engine speed (as estimated via a crankshaft acceleration sensor), engine temperature (as estimated via an engine coolant temperature sensor 116), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution request, and further correlates the change in the dilution request with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to EGR valve 80 (e.g., as sent to the stepper motor or other valve actuation device) as the output.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; a temperature signal from exhaust gas sensor 128, which may be used by controller 12 to determine the temperature of the exhaust gas; a signal from an exhaust differential pressure sensor 182 that measures a pressure difference between upstream of DPF 181 and downstream of DPF 181; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving a signal from accelerator pedal position sensor 134 or brake pedal position sensor 137 indicating that braking is requested, controller 12 may discontinue fueling to cylinder 14 by discontinuing signal FPW from electronic driver 168 so that fuel is not delivered via fuel injector 166 and may further adjust intake valve 150 and exhaust valve 156 via actuators 152 and 154, respectively.

As described above, FIG. 1 shows only one cylinder of a multi-cylinder engine. As such, each cylinder may similarly include its own set of intake/exhaust valves, fuel injector(s), etc. It will be appreciated that engine 10 may include any suitable number of cylinders, including 2, 3, 4, 5, 6, 8, 10, 12, or more cylinders in various configurations. Further, each of these cylinders can include some or all of the various components described and depicted by FIG. 1 with reference to cylinder 14.

As elaborated above, DPF 181 captures soot to reduce an amount of particulate matter emitted from vehicle 5. DPF regeneration (oxidization and burning of the soot to empty DPF 181) is used to reduce exhaust backpressure, for example, and to enable DPF 181 to continue capturing soot. In order to burn the soot from DPF 181, it is desired for the exhaust gases flowing through the exhaust system to reach temperatures around 600 K. However, the exhaust gases may not reach the desired temperatures for regeneration during nominal engine operation. For example, extended high speed operation of vehicle 5 may result in exhaust gases being hot enough to passively regenerate DPF 181, but when vehicle 5 is not driven at high speeds for extended periods (e.g., due to in-town driving), the exhaust gases may not be hot enough to regenerate DPF 181. Therefore, active DPF regeneration may be triggered once the amount of soot captured surpasses a soot load threshold, which will be elaborated below in regard to FIG. 2. Active DPF regeneration includes post combustion fuel injection, referred to herein as "post injection," wherein unburnt fuel is delivered to DOC 178, where the oxidation of the unburnt fuel produces an increase in the exhaust gas temperature (e.g., exotherms) at an inlet of DPF 181. However, fuel post injection increases fuel consumption and cylinder wall wetting.

Further, combustion may be discontinued in one or more cylinders during some engine operating conditions, which may further reduce exhaust gas temperatures and/or reduce air flow through the engine, which may in turn reduce an amount of fuel that can be delivered via post injection. For example, due to a low torque demand, one or more cylinders (e.g., cylinder 14) within the engine may be deactivated to increase fuel economy. Since combustion is occurring in fewer cylinders, the exhaust gas temperature may decrease. As another example, engine braking, which may be facilitated by decompression device 153, may be used to slow vehicle 5, causing the cylinders to be used for decompression braking instead of for combustion. As such, similar to deactivating cylinders, the exhaust gas temperatures may not reach the desired 600 K for DPF regeneration. As such, control methods that enable robust DPF regeneration while combustion is discontinued may increase an efficiency of DPF regeneration, thereby decreasing the exhaust backpressure for more efficient engine operation and enabling DPF 181 to capture additional soot particulates.

Therefore, FIG. 2 shows an example method 200 for operating an engine with post fuel injection for DPF regeneration during a cylinder deactivation event in a vehicle. For example, the DPF may be DPF 181 of vehicle 5 shown in FIG. 1, and an example cylinder that may be deactivated may be cylinder 14, also shown in FIG. 1. Although method 200 will be described with respect to the engine system and components shown in FIG. 1, method 200 may be applied to other engine systems without departing from the scope of this disclosure. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1 and elaborated below. The controller may employ actuators of the engine system to adjust engine operation, such as by adjusting operation of a fuel injector (e.g., fuel injector 166 of FIG. 1) to perform the post injection of fuel.

At 202, method 200 includes estimating operating conditions. The operating conditions may include, for example, an exhaust gas temperature, an accelerator pedal position (e.g., signal PP output by a pedal position sensor), an engine temperature (e.g., as estimated from an output of an engine coolant temperature sensor, such as engine coolant temperature sensor 116 of FIG. 1), a mass air flow of intake air provided to the engine (e.g., MAF), a torque demand, a boost demand, a fuel injection amount and timing, a position of an EGR valve (e.g., EGR valve 80 of FIG. 1), cylinder valve lift and timing settings, and an exhaust gas pressure. As an example, the exhaust gas pressure may be a differential pressure measured by an exhaust differential pressure sensor (e.g., exhaust differential pressure sensor 182 of FIG. 1). A signal received by the controller from the exhaust differential pressure sensor may indicate a difference in exhaust pressure between a position upstream of the DPF, before the exhaust gases flow through the DPF, and a position downstream of the DPF, after the exhaust gases flow through the DPF. Further, the controller may use the differential pressure to estimate a soot load of the DPF. As another example, the soot load may be measured virtually by the controller inputting, for example, the engine speed and the exhaust temperature into a look-up table, algorithm, or map, which may output the estimated soot load. As another example, the exhaust gas temperature may be measured by an exhaust gas sensor (e.g., exhaust gas sensor 128 shown in FIG. 1) and indicates the temperature of the exhaust gas.

At 204, method 200 includes determining if DPF regeneration is requested. DPF regeneration may be requested when the soot load increases above an upper soot load threshold. The upper soot load threshold may be a positive non-zero value stored within a memory of the controller. This non-zero value may be a percentage of the DPF covered in soot. In one example, at the upper soot load threshold may be approximately 45% of a soot holding capacity of the DPF.

In other examples, the upper soot load threshold may be higher than 45% (e.g., 60%) or lower than 45% (e.g., 40%) of the soot holding capacity of the DPF. If the soot load is not at or above the upper soot load threshold, then DPF regeneration may not be requested, although passive DPF regeneration may still occur while the vehicle is driven at highway speeds (e.g., 60-70 mph) for extended periods (e.g., 20-30 minutes). Due to the high temperatures used for DPF regeneration, the request for DPF regeneration is a request for generating exotherms in the exhaust system (e.g., at the DOC).

If DPF regeneration has not been requested, such as when the soot load does not increase above the upper soot load threshold, method 200 proceeds to 206 and includes not increasing the exhaust gas temperature via adjustments to engine operation. As such, engine operating parameters will not be adjusted to facilitate active regeneration. For example, post fuel injection will not be performed, as raising the DPF temperature by generating exotherms in the exhaust system is not desired, and the EGR valve may adjusted based on a desired engine dilution. Method 200 may then end.

Returning to 204, if DPF regeneration has been requested, method 200 proceeds to 208 and includes determining if cylinder deactivation has been requested. For example, conditions for cylinder deactivation may be met if the torque demand, or engine load, is below a threshold torque demand (or engine load). The threshold torque demand (or engine load) may be a pre-determined, non-zero value stored in controller memory below which a subset of cylinders may be able to produce the demanded torque, enabling the engine to operate at higher efficiency and increased fuel economy. For example, the engine may be a variable displacement engine (VDE). Further, deactivating cylinders may be enabled only if the engine coolant temperature is above a threshold to preempt cold cylinder related issues, which may result in higher particulate matter generation. If cylinder deactivation has not been requested, method 200 proceeds to 210 and includes providing main injection fueling to each cylinder. For example, a fuel injector (e.g., fuel injector 166 shown in FIG. 1) coupled to each cylinder may be actuated within a compression stoke of the corresponding cylinder to deliver the main injection fueling. An amount of fuel injected may be determined based on the torque demand. For example, when the torque demand is higher, more fuel may be provided to the cylinder to increase the amount of torque produced during combustion. As one example, the controller may input the torque demand into a look-up table, algorithm, or map, which may output the amount of fuel to inject. Further, the amount to fuel to inject may be delivered via one or more injections. In this way, the main fuel injection provides fuel for combustion in every cylinder, thereby producing engine torque in every cylinder during an engine cycle.

At 212, method 200 includes increasing the exhaust gas temperature via adjustments to engine operation. For example, to increase the exhaust gas temperature, additional oxygen may be provided to the cylinders by adjusting the intake valve timing or positioning the VGT vanes to increase boost, and post fuel injections may be provided to react with the additional oxygen at a DOC positioned upstream of the DPF (e.g., DOC 178 of FIG. 1) to generate exotherms for heating the DPF. In another example, the EGR valve may be closed to increase an amount of hot exhaust gas flowing to the DPF. For regeneration to occur, a temperature of the DPF may be increased to at least a threshold temperature. The threshold temperature may be a non-zero, positive temperature value stored in controller memory at or above which soot is burned from the DPF. As one example, the threshold temperature is within a range between 550 and 650 K. For example, the threshold temperature may be 600 K. With the DPF temperature reaching the threshold temperature, regeneration may occur, and soot trapped within the DPF may be burned to reduce the soot load of the DPF.

Further, the DPF regeneration may be continued until the soot load of the DPF is decreased to a lower threshold soot load (e.g., lower than the upper threshold soot load). The lower threshold soot load may be a pre-determined value stored in the memory of the controller that corresponds to the DPF being substantially empty. For example, the lower threshold soot load may be in a range from 0-10% of the DPF soot holding capacity. As an example, the lower threshold soot load may be 5%. Additionally, fuel post injection may occur in active cylinders close to the exhaust valve opening. Once the DPF regeneration reaches the lower threshold soot load, the engine may be operated as described above at 206, for example.

Method 200 may then end. For example, method 200 may be repeated at a pre-determined frequency during engine operation to provide DPF regeneration responsive to the soot load reaching the upper threshold load, for example.

Returning to 208, if cylinder deactivation is requested, then method 200 proceeds to 216 and includes selecting cylinder(s) for deactivation. For example, the number of cylinders to be deactivated may increase as the driver torque demand decreases. In still other examples, the controller may determine a desired induction ratio (a total number of cylinder firing events divided by a total number of cylinder compression strokes) based at least on torque demand. The controller may determine the number of cylinders to deactivate (or the desired induction ratio) by inputting the operating conditions, such as one or more of the torque demand and the engine load, into one or more look-up tables, maps, or algorithms and outputting the number of cylinders to deactivate for the given conditions.

In some examples, the controller may select a group of cylinders and/or an engine bank to deactivate based on the operating conditions. The selection may be based on, for example, which group of cylinders was deactivated during a previous cylinder deactivation event. For example, if during the previous cylinder deactivation event, a first group of cylinders were deactivated, then the controller may select a second group of cylinders that is different than the first group of cylinders for deactivation during the present cylinder deactivation event. In still another example, cylinder deactivation may be restricted to specific cylinders due to hardware of the engine. Using a V-8 engine as an example, the hardware may restrict deactivation to two specific cylinders from each engine bank, for example. In still other examples, a cylinder deactivation pattern may be selected based on the torque demand in order to maintain vehicle operability and driveability, as the remaining fueled cylinders provide all of the engine torque. Further, the cylinder deactivation pattern may be selected in order to mitigate engine noise, vibration, and harshness (NVH) depending on a configuration of the engine (e.g., a layout and a total number of cylinders) and may include determining a duration of deactivation of each cylinder in the selected pattern.

At 218, the method 200 includes deactivating the selected cylinder(s). Deactivating the selected cylinder(s) refers to discontinuing combustion in the selected cylinder(s). Deactivating the selected cylinder(s) includes discontinuing the main injection fueling of the selected cylinder(s), as indicated at 220. Main injection fueling of the cylinders is stopped by the controller discontinuing a fuel pulse-width signal to the fuel injector coupled to the each of the selected cylinder(s). As such, there is no longer fuel available to the cylinder for combustion.

In addition to discontinuing main injection fueling of the cylinder(s) selected for deactivation, deactivating the selected cylinder(s) further includes maintaining the intake or exhaust valve of the selected cylinder(s) open, as indicated at 222. Depending on a desired fuel post injection timing, the controller may select between maintaining open the exhaust and maintaining open the intake valve. The exhaust valve may be held open for later fuel post injection timings while the intake valve may be held open during earlier fuel post injection timings, which will be further elaborated with respect to FIG. 4.

At 224, method 200 includes performing post injection of the fuel during a threshold timing range each engine revolution. As will be elaborated with respect to FIG. 4, the threshold timing range may reduce wall wetting, bore washing, and fuel-in-oil dilution while still enabling exotherms to be generated at the DOC to increase the DPF temperature to the temperature threshold for DPF regeneration during cylinder deactivation. In some examples, performing the post injection of fuel during the threshold timing range each engine revolution (e.g., a 360° revolution of a crankshaft of the engine) includes performing the post injection in one or more deactivated cylinder(s) and not in active cylinder(s), as optionally indicated at 226. For example, active cylinder(s) may not receive any fuel post injection, but still may receive main injections of fuel for producing engine torque via combustion. As such, the fuel injectors of the active cylinder(s) may be actuated during the compression stroke for main injection fueling, but may not be actuated for any additional fuel injections during the compression stroke or during the exhaust stroke. In other examples, performing the post injection of fuel during the threshold timing range each engine revolution includes preforming the post injection in one or more deactivated cylinder(s) and also in active cylinder(s), as optionally indicated at 228. In such examples, the fuel post injection, described in method 400 of FIG. 4, may be injected into a selected number of active and deactivated cylinder(s). For example, some or all active cylinder(s) may first receive the main fuel injection close to BDC of the compression stroke and then receive additional fuel injections within the threshold timing range that will be described with respect to FIG. 4. The controller may determine to increase or decrease the number of cylinder(s) receiving the post injection, both active and deactivated, based on if the temperature of the exhaust gas. For example, the controller may increase the number of cylinder(s) receiving the fuel post injection to increase the exhaust gas temperature.

Method 200 may then end. For example, method 200 may be repeated responsive to a change in the operating conditions in order to reactivate deactivated cylinders (e.g., responsive to an increased torque demand) or to discontinue DPF regeneration responsive to the soot load of the DPF decreasing below the lower threshold soot load. Note that in some examples, cylinder deactivation may already be occurring before DPF regeneration is requested. In such cases, the selected cylinder(s) may be deactivated before regeneration is requested at 202. However, post fuel injection may not occur in these cylinders until DPF regeneration is requested.

Turning now to FIG. 3, an example method 300 for operating an engine with post fuel injection for DPF regeneration during an engine braking event in a vehicle is shown. For example, the DPF may be DPF 181 shown in FIG. 1. As another example, engine braking may be performed by a decompression device, such as decompression device 153 shown in FIG. 1. Although method 300 will be described with respect to the engine system and components shown in FIG. 1, method 300 may be applied to other engine systems without parting from the scope of this disclosure. Instructions for carrying out method 300 may be executed by a controller (e.g., controller 12 of FIG. 1) based on instructions stored on a memory of the controller and in conjunction with signals received from sensors of the engine system, such as the sensors described above with reference to FIG. 1 and elaborated below. The controller may employ actuators of the engine system to adjust engine operation, such as by adjusting operation of fuel injectors to inject fuel post injections within cylinders of the engine.

Method 300 starts at 302, which includes estimating operating conditions. The operating conditions may include, for example, an engine speed, an intake manifold pressure (e.g., MAP), a mass air flow of intake air provided to the engine (e.g., MAF), an engine temperature, a torque demand, a boost demand, a fuel injection amount and timing, cylinder valve lift and timing settings, an exhaust gas temperature, a desired engine dilution, a soot load of the DPF, a brake pedal position, an accelerator pedal position, etc., such as elaborated above with respect to 202 of FIG. 2. As one example, the brake pedal position and the accelerator pedal position may be determined based on signals received from respective pedal position sensors (e.g., brake pedal position sensor 137 and accelerator pedal position sensor 134 of FIG. 1, respectively). Together, the accelerator pedal position and the brake pedal position may be used by the controller to determine the torque demand, which may be a positive torque demand or a negative (e.g., braking) torque demand.

At 304, method 300 includes determining if DPF regeneration is requested. As described above at 204 of method 200, DPF regeneration may be requested if the soot load has surpassed the upper soot load threshold.

If DPF regeneration is not requested at 304, method 300 proceeds to 306 and includes not increasing the exhaust gas temperature via adjustments to engine operation. Similar to 206 of method 200, if the soot load has not surpassed the upper soot load threshold, engine operating parameters will not be adjusted to facilitate active regeneration. For example, post fuel injection will not be performed, and an EGR valve may be adjusted to provide the desired engine dilution.

The method 300 may then end. For example, method 300 may be repeated at a pre-determined frequency during engine operation and/or responsive to a change in the operating conditions in order to provide efficient DPF regeneration responsive to the soot load exceeding the upper soot load threshold, for example.

If DPF regeneration is requested at 304, then method 300 continues to 308, which includes determining if engine braking is requested. For example, engine braking may be requested responsive to a change in one or more of the accelerator pedal position and the brake pedal position. As an example, engine braking may be requested responsive to a tip-out event, where the accelerator pedal position changes from a depressed position to an undepressed, neutral position or a less depressed position. As another example, engine braking may be requested responsive to the brake pedal position increasing (e.g., being further depressed). As still another example, engine braking may be requested responsive to a decrease in the demanded torque and/or in response to a non-zero requested brake torque, as determined from the accelerator pedal position and the brake pedal position. Further, engine braking may be requested when the engine speed is greater than a threshold engine speed. The threshold engine speed may be a pre-determined, non-zero engine speed stored in memory below which further slowing the engine (e.g., via engine braking) may result in the engine inadvertently shutting off.

If engine braking is not requested, method 300 continues to 310, which includes not operating the decompression device. As described above with respect to FIG. 1, the decompression device may be a CVVL system used to control intake and exhaust valves for engine braking or may be a Jake brake. For example, when the CVVL system is not operated as a decompression device, it may be used to facilitate combustion in the cylinders by opening and closing the intake and exhaust valves during intake and exhaust strokes, respectively.

At 312, the method 300 includes providing main injection fueling to each cylinder. Similar to 210 of method 200, a fuel injector (e.g., fuel injector 166 shown in FIG. 1) coupled to each cylinder is actuated by the controller within the compression stoke of the corresponding cylinder. In this way, the main fuel injection provides fuel to mix with air introduced to the cylinder by an intake valve opening, and both are compressed by a piston until combustion occurs, producing torque to power the vehicle.

At 314, the method 300 includes increasing the exhaust gas temperature via adjustment to engine operation, as explained above at 212 of method 200. Method 300 may then end. For example, method 300 may be repeated responsive to the operating conditions changing so that active DPF regeneration may be discontinued once the soot load decreases below a lower soot load threshold (e.g., the lower soot load threshold discussed above with respect to FIG. 2).

Returning to 308, if engine braking is requested, then method 300 continues to 316 and includes discontinuing main injection fueling. Main injection fueling of the cylinders is stopped by the controller discontinuing a fuel pulse-width signal to the fuel injector coupled to each cylinder. As such, there is no longer fuel available to the cylinder for combustion.

At 318, method 300 includes operating the decompression device to control air flow through the engine. As described above with respect to FIG. 1, the decompression device may be the CVVL system and may be operated to slow down the vehicle by reducing compression temperatures and pressures within the cylinder. In one example, one or more exhaust valves of each cylinder may be held open throughout the four-stroke engine cycle by the decompression device, while the intake valve may be operated with a conventional intake valve timing for the four-stroke cycle, as will be elaborated herein. As such, the gas within the cylinder is compressed, but the compression does not create pressures and temperatures high enough to cause ignition. Around TDC of the conventional expansion (e.g., power) stroke, the decompression device allows high pressure gas to flow out of the cylinder via the open exhaust valve. This outflow, along with the piston moving to BDC, causes the cylinder pressure to decrease and fall below an exhaust manifold pressure. Due to the pressure difference between the cylinder and the exhaust manifold, the cylinder fills with exhaust gases entering through the opening created by the exhaust valve during the conventional exhaust stroke. As the intake valve is opened before TDC of the exhaust stroke, gas in the cylinder flows into the exhaust manifold via the open exhaust valve and into the intake manifold via the open intake valve as the cylinder pressure equilibrates with the exhaust and intake manifold pressures. During the conventional intake stroke, gas may again fill the cylinder as the piston moves from TDC to BDC. In this way, power is not generated in the cylinder as the piston uses energy to compress the air, and the compressed air is released without combustion occurring, resulting in a net loss of energy.

In other examples, one or more intake valves of each cylinder may be held open while the exhaust valve is operated with a conventional exhaust valve timing for a four-stroke engine cycle, as will be elaborated herein. Maintaining the intake valve open (instead of the exhaust valve) may allow any fuel-rich leakage across the open valve to flow into the intake manifold, where it can be re-inducted into the cylinder instead of flowing to the exhaust manifold. In particular, the intake valve may be held open when a desired fuel post injection timing is earlier, and the exhaust valve may be held open when the desired fuel post injection timing is later, which will be elaborated below with respect to FIG. 4.

At 320, the method 300 includes performing a post injection of fuel during a threshold timing range during each engine revolution, as will be described in detail with respect to FIG. 4. As mentioned above with respect to FIG. 2, the threshold timing range may enable an amount of fuel delivered via post injection during DPF regeneration while combustion is discontinued to be increased without increasing wall wetting, for example. The fuel delivered via the post injection may then flow through the exhaust system to a DOC (e.g., DOC 178 shown in FIG. 1) to generate exotherms, increasing the temperature of the exhaust gases at an inlet of the DPF for DPF regeneration.

Method 300 may then end. For example, method 300 may be repeated responsive to a change in the operating conditions so that combustion may be resumed in each cylinder when engine braking is no longer requested.

Figure 4:
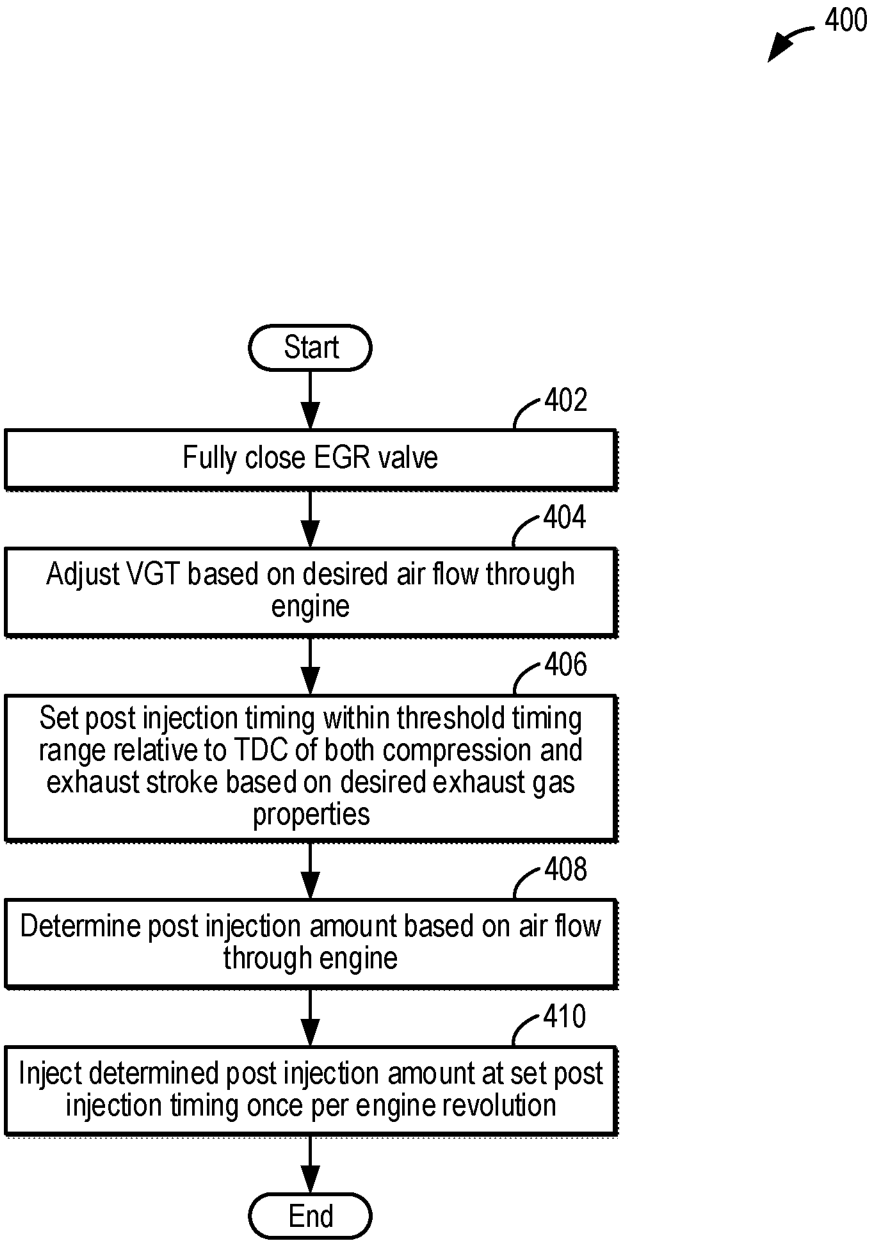
FIG. 4 shows a method for controlling fuel post injection during DPF regeneration when combustion is discontinued in at least one cylinder.

Continuing now to FIG. 4, an example method 400 for providing fuel post injection is shown. Although method 400 will be described with respect to the engine system and components shown in FIG. 1, method 400 may be applied to other engine systems without departing from the scope of this disclosure. As an example, method 400 may be performed by a controller (e.g., controller 12 of FIG. 1) as a part of method 200 of FIG. 2 (e.g., at 224) or as a part of method 300 of FIG. 3 (e.g., at 320). Additionally or alternatively, method 400 may be performed responsive to a request for fuel post injection for DPF regeneration while combustion is discontinued in at least one cylinder of the engine.

At 402, method 400 includes fully closing an EGR valve. For example, the EGR valve may be EGR valve 80 of EGR system 83 shown in FIG. 1. The EGR may be in various open positions that enable exhaust gases to flow to an intake manifold of the engine before the controller closes the EGR valve for performing the fuel post injection. As such, the controller may then send a signal to the EGR valve to adjust the EGR valve to a fully closed position, where the exhaust gases are blocked from flowing to the intake manifold. As another example, the EGR valve may already be in a fully closed position (e.g., during high engine loads). Instead of closing the EGR valve, the controller maintains the EGR valve in the fully closed position. With the EGR valve fully closed, more exhaust gases reach the DPF, and the fuel provided via the post injection is prevented from recirculating through the engine and causing fouling in the intake system.

At 404, method 400 includes adjusting a VGT based on a desired air flow through the engine. By adjusting vanes of a turbine of the VGT, an effective aspect ratio of the turbine is adjusted. For example, adjusting the VGT turbine vanes to a more open position enables less flow restriction through the turbine but may reduce boost at lower engine speeds, while adjusting the vanes to a more closed position may increase the speed of the turbine while restricting flow through the turbine. For DPF regeneration, the VGT is used to adjust the backpressure of the exhaust. In conditions of decompression braking with all cylinders deactivated, there is no boost produced. Increasing the exhaust backpressure by closing the VGT will increase backflow from the exhaust, into the cylinder and in part into the intake manifold in and around BDC when the exhaust valve first opens. This will reduce an exhaust mass flow rate.

In other embodiments, an intake throttle can be used to control air flow through the engine. Closing the intake throttle may decrease the intake manifold pressure and lead to lower initial and final compression pressures. Backflows from the exhaust, through the cylinder, and into the intake will also increase during the period when the exhaust valve is open due to the lower intake manifold pressure and larger pressure difference across the engine. This will also reduce the exhaust mass flow rate. Reducing the exhaust mass flow rate may reduce an occurrence of hydrocarbon slip (e.g., from the fuel delivered via the post injection) through a DOC (e.g., DOC 178 shown in FIG. 1). For example, hydrocarbon slip may refer to hydrocarbons that escape oxidation at the DOC and pass through the DOC unchanged, which may increase vehicle emissions and/or cause uncontrolled DPF regeneration.

At 406, method 400 includes setting a post injection timing within a threshold timing range (e.g., the threshold timing range described with respect to FIGS. 2 and 3) relative to TDC of both compression and exhaust strokes based on desired exhaust gas properties. As mentioned above, injecting the post injection fuel during the threshold timing range reduces wall wetting, bore washing, and fuel-in-oil dilution while still providing additional heat to the exhaust gas by producing exotherms in the DOC, and thus to the DPF. As one example, the threshold timing range may encompass timings between 30 crank angle degrees before TDC of the compression stroke and 30 degrees after TDC of the compression stroke and may also encompass timings between 30 crank angle degrees before TDC of the exhaust stroke and 30 crank angle degrees after TDC of the exhaust stroke. Thus, the threshold timing range may be centered at TDC during each engine revolution and span 60 crank angle degrees. In other examples, the threshold timing range may be larger or smaller than 60 crank angle degrees. For example, the threshold timing range may span from 40 crank angle degrees before TDC to 40 degrees after TDC. Further, the threshold timing range may be stored in non-transitory memory. In some examples, it may be desirable to favor increased mixing of air with the fuel delivered via the fuel post injection, which will be described in further detail with respect to FIG. 5. In such examples, the fuel post injection may occur earlier within the threshold timing range. For example, injection may occur before TDC of the compression stroke and before TDC of the exhaust stroke, both times being when the temperature of the cylinder is increased allowing for increased fuel evaporation and mixing with the air. In other examples, it may be desirable to decrease a likelihood of ignition of the fuel delivered via the fuel post injection, which will be described in further detail with respect to FIG. 6. In such examples, the fuel post injection may occur later within both threshold timing ranges, after TDC of the compression stroke and after TDC of the exhaust stroke.

Therefore, as one example, the controller may set the post injection timing based on at least an exhaust gas temperature (e.g., as measured at 202 of method 200 or 302 of method 300). For example, the controller may input the exhaust gas temperature into a look-up table, algorithm, or map stored in memory, which may output the specific post injection timing to use within the threshold timing range relative to TDC of both the compression stroke and the exhaust stroke.

At 408, the method 400 includes determining a post injection amount based on an air flow through the engine. For example, the air flow through the engine may be measured by a mass air flow sensor (e.g., MAF sensor 122 shown in FIG. 1). Increasing the air flow through the engine may increase the amount of fuel that can be delivered to the cylinder via post injection since there is more air available to react with the fuel to generate exotherms at the DOC. As one example, the controller may input the mass air flow into a look-up table, algorithm, or map stored in memory, which may output the post injection amount to use for each post injection.

At 410, the method 400 includes injecting the determined post injection amount at the set post injection timing once per engine revolution. To inject the fuel for the post injection, the controller transmits a fuel pulse-width signal corresponding to the determined post injection amount at the determined timing to the fuel injector of the cylinder receiving fuel post injection. In some examples, all cylinders of the engine may receive the fuel post injection while in other examples, a subset of cylinders may receive the fuel post injection, such as described above at 224 of method 200 of FIG. 2. In some examples, the injection of fuel may be a continuous stream of fuel while in others the fuel may be injected in multiple, quick pulses. Further, because the fuel post injection is performed once per engine revolution, two post injections are performed per cylinder per engine cycle (e.g., one in the threshold timing range relative to TDC of the compression stroke and one in the threshold timing range relative to TDC of the exhaust stroke), as will be further described with respect to FIGS. 5 and 6.

The method 400 may then end. As one example, method 400 may be repeated at a pre-determined frequency so that the post injection amount or timing may be adjusted based on, for example, changes to the engine air flow or changes to the exhaust gas temperature. In this way, the controller may accurately maintain the exhaust gas temperature over a threshold temperature for DPF regeneration without increasing wall wetting and fuel-in-oil dilution.

Together, FIGS. 2-4 provide a method for maintaining DPF regeneration during events that cool the exhaust system. Specifically, FIGS. 2 and 4 provide a control routine for increasing or maintaining the exhaust temperature while cylinders are deactivated within the engine for increasing engine efficiency, and FIGS. 3 and 4 provide a control routine for increasing or maintaining the exhaust temperature while the engine is used to slow down the vehicle. As a result, the exhaust temperature may enable DPF regeneration without increasing intake system fouling and fuel wetting in the cylinder, such as bore washing and oil-in-fuel dilution.

Turning now to FIG. 5, a first exemplary timing chart 500 demonstrating fuel post injection timing during DPF regeneration is shown. In particular, first exemplary timing chart 500 shows a fuel post injection timing that prioritizes mixing between air and fuel from the fuel post injection. For exemplary timing chart 500, a piston position is shown in a plot 502, an exhaust valve lift is shown in a dashed plot 503, an intake valve lift is shown in a plot 505, an in-cylinder pressure is shown in a plot 504, a cylinder air mass is shown in a plot 506, a cylinder temperature is shown in a plot 508, and a fuel injector status is shown in a plot 510. In addition to the plots, a first crank angle range 512 is indicated between 150 crank angle degrees (CAD) and 210 CAD, and a second crank angle range 514 is indicated between 510 CAD and 570 CAD.

For all of the above, the horizontal axis represents engine position (in CAD), with the engine position increasing along the horizontal axis from left to right. For example, one four-stroke engine cycle is shown, which occurs from 0 to 720 CAD (e.g., two full rotations of an engine crankshaft). In the example timing charts, the compression stroke corresponds to an interval from 0 CAD to 180 CAD, the power stroke corresponds to an interval from 180 CAD to 360 CAD, the exhaust stroke corresponds to an interval from 360 CAD to 540 CAD, and the intake stroke corresponds to an interval from 540 CAD to 720 CAD. The vertical axis of each plot represents the labeled parameter. For plot 502, the vertical axis shows piston position relative to TDC. For plots 504, 506, and 508, the labeled parameter increases up the vertical axis from bottom to top. For plots 503 and 505, the valve lift amount increases up the vertical axis from a fully closed position. For plot 510, the vertical axis indicates whether the fuel injector is open (e.g., the fuel injector is actuated) or closed (e.g., the fuel injector is not actuated), as labeled.

First crank angle range 512 begins at 150 CAD, which is within the compression stroke near TDC, and ends at 210 CAD, which is within the power stroke near TDC (e.g., ranging between +/−30 CAD ATDC of the compression stroke). Thus, first crank angle range 512 spans 60 CAD. In other examples, the first crank angle range may begin 40 CAD before TDC of the compression stroke and end 40 CAD after TDC of the compression stroke (e.g., ranging between +/−40 CAD ATDC of the compression stroke). For example, first crank angle range 512 may extend from 140 CAD to 220 CAD, spanning 80 CAD. In still other examples, first crank angle range 512 may begin at another crank angle that is in a range between 30 and 40 CAD before TDC of the compression stroke and may end at another crank angle that is in a range between 30 and 40 CAD after TDC of the compression stroke for range that is between 60 and 80 CAD. The first crank angle range 512 indicates when in the engine cycle a first fuel post injection may occur in the cylinder in order to reduce wall wetting, for example.

In the example of timing chart 500, the intake valve (plot 505) is maintained open throughout the four-stroke cycle with relatively low valve lift by a decompression device (e.g., decompression device 153 shown in FIG. 1). As the piston rises toward TDC (plot 502) and compresses the air within the cylinder, pressure increases within the cylinder (plot 504). Further, the in-cylinder pressure peaks within first crank angle range 512, shortly before TDC. As the pressure builds up in the cylinder, the temperature (plot 508) also increases within the cylinder. However, a peak in-cylinder pressure and a peak in-cylinder temperature may be lower than when the intake valve is not held open via the decompression device.

In the example shown in FIG. 5, the first fuel post injection timing is determined based on a desire to increase mixing between post injected fuel and air. As such, the first fuel post injection occurs at CAD1, which is near the beginning of first crank angle range 512 and while the in-cylinder temperature is peaking (plot 508), as indicated by the fuel injector opening (plot 510). By starting the fuel injection at CAD1, the fuel delivered via the first fuel post injection may more readily evaporate due to the high the temperatures of the cylinder (plot 508) caused by the increasing pressure of the cylinder (plot 504). The evaporation of the fuel from the first fuel post injection allows for increased mixing with air in the cylinder. Note that while first exemplary timing chart 500 shows the fuel injector as continuously open, the fuel injector may be alternatively pulsed open and closed within the shown open range. A change in air flow is indicated by the drop in air mass (plot 506) within the first 30 CAD of the first crank angle range 512, as the higher pressure gas flows out of the cylinder via the open intake valve.

The intake valve is maintained open (instead of the exhaust valve) when the first fuel post injection is earlier within first crank angle range 512 to reduce leakage of the injected fuel through the exhaust valve while the air mass (plot 506) is rapidly decreasing between approximately 150 CAD and approximately 210 CAD. Instead, any rich gas outflow may occur through the open intake valve and may be reintroduced into the cylinder as the air mass (plot 506) increases after approximately 210 CAD. Further, at least a portion of the fuel injected during the first fuel post injection may flow out of the cylinder via the open exhaust valve (dashed plot 503) during the exhaust stroke.

In addition to first crank angle range 512, timing chart 500 includes a second crank angle range 514, which indicates a range during which a second fuel post injection may occur in order to again reduce wall wetting. The second crank angle range starts at 510 CAD, 30 CAD before TDC of the intake stroke, and ends at 570 CAD, 30 CAD after TDC of the intake stroke. Thus, second crank angle range 514 is centered on TDC of the exhaust stroke in the same manner that first crank angle range 512 is centered on TDC of the compression stroke. In other examples, the second crank angle range may vary similarly to that described above with respect to first crank angle range 512, such as beginning at another crank angle that is in a range between 30 and 40 CAD before TDC of the exhaust stroke and may end at another crank angle that is in a range between 30 and 40 CAD after TDC of the exhaust stroke.

In the example shown in FIG. 5, the second fuel post injection occurs at CAD2 (plot 510), near the beginning of second crank angle range 514. By injecting fuel at CAD2, the fuel may be heated by the temperature of the air within the cylinder (plot 508) before the temperature decreases due to the air mass (plot 506) in the cylinder increasing. During the second fuel post injection and within second crank angle range 514, the in-cylinder pressure (plot 504) is relatively low since the exhaust valve (dashed plot 503) is partially open at the start of the crank angle range and the intake valve (plot 505) remains open. With the low pressures, combustion of the fuel injected during the second fuel post injection will not occur (e.g., has a decreased probability to occur), and the injected fuel may enter the exhaust system via the open exhaust valve and reach the DOC to generate exotherms for DPF regeneration. For example, the injected fuel may preferentially flow to the exhaust system instead of the intake system because the valve lift of the exhaust valve (dashed plot 503) is greater than the valve lift of the intake valve (plot 505). Further, the air mass (plot 506) flows out of the cylinder during the start of the second crank angle range 514 until the exhaust valve closes, and the air mass may again increase within the cylinder during the intake stroke as air flows into the cylinder via the open intake valve (plot 505) as the piston moves from TDC to BDC (plot 502). Due to the relatively high temperatures, the fuel may evaporate and prevent wall wetting within the cylinder, and the fuel may be exhausted when the exhaust valve opens during the subsequent exhaust stroke.

Continuing to FIG. 6, a second exemplary timing chart 600 demonstrates fuel post injection timing during DPF regeneration. In particular, second exemplary timing chart 600 shows a fuel post injection timing for decreasing the likelihood of fuel delivered via the fuel post injection igniting within the cylinder. For example, the fuel post injection timing shown in FIG. 5 may have a higher probability of igniting than the fuel post injection timing described below with respect to FIG. 6 due to the higher temperatures and pressures present while the fuel is injected at the timing described with respect to FIG. 5. As similar parameters are numbered the same in FIG. 6 as in FIG. 5, the parameters will not be reintroduced.

In the example shown in FIG. 6, the exhaust valve (dashed plot 503) is maintained open throughout the four-stroke cycle with relatively low valve lift by a decompression device, and the first fuel post injection timing is determined based on the air mass (plot 506) flowing into and out of the cylinder. In this example, the first fuel post injection occurs at CAD3, which is near the end of the first crank angle range 512, as indicated by the fuel injector opening (plot 510). By starting the first fuel post injection at CAD3, after the air has flowed out of the cylinder via the open exhaust valve (dashed plot 503), the fuel may have time to mix with air within the cylinder, but the temperature of the cylinder (plot 508) may not be high enough to cause the fuel to evaporate. Near BDC of the exhaust stroke, the air fuel mixture flows out of the cylinder and into an exhaust system (e.g., exhaust manifold 148 shown in FIG. 1), eventually reaching the DOC to generate exotherms for DPF regeneration.

The second fuel post injection occurs near the end of the second crank angle range 514 at CAD4. At TDC of the intake stroke, the intake valve (plot 503) is opened, allowing air to flow into the cylinder, as shown by the increasing air mass (plot 506). The fuel injector (plot 510) is opened at CAD4, providing the second fuel post injection as the air mass (plot 506) is increasing in the cylinder. By starting the second post fuel injection at CAD4, temperatures in the cylinder (plot 508) are low enough that ignition of the injected fuel will not occur. The fuel delivered via the second fuel post injection may flow out of the cylinder as the air mass subsequently decreases during the compression stroke (plot 506) through the open exhaust valve (plot 505), and may be oxidized in the DOC to produce exotherms for DPF regeneration.

Turning now to FIG. 7, an example timeline 700 for a DPF regeneration during passive regeneration, cylinder deactivation, and engine braking is shown. For example, the DPF may be DPF 181 and the engine may be engine 10, both shown in FIG. 1. An engine speed is shown in a plot 702, a DPF soot load is shown in a plot 704, a DPF temperature is shown in a plot 708 while a potential DPF temperature is shown by a dashed plot 710, a cylinder fueling state is shown in a plot 712, a decompression mode is shown in a plot 714, a VGT (e.g., VGT 170 shown FIG. 1) position is shown in a plot 716, and an EGR valve position is shown in a plot 718. Further, an upper soot threshold is shown by a dashed line 706, and a lower soot threshold is shown by a dashed line 707. The upper soot load threshold is a higher threshold percentage of the DPF covered by soot above which active DPF regeneration is requested to reduce exhaust backpressure, for example (e.g., 45%). The lower soot load threshold is a lower threshold percentage of the DPF covered in soot below which active DPF regeneration is discontinued and the DPF is considered emptied. Further still, a DPF temperature threshold is shown by a dashed line 709, at or above which soot may be burned from the DPF. For example, the DPF temperature threshold may be at least 600 K.

For all of the above, the horizontal axis represents time, with time increasing along the horizontal axis from left to right. The vertical axis represents each labeled parameter. For plots 702, 704, 708, and 710, the labeled parameter increases up the vertical axis from bottom to top. For plot 712, the vertical axis shows the cylinder fueling state ranging from all unfueled to all fueled. For example, the number of fueled cylinder(s) increases up the vertical axis until all of the cylinders are fueled. As a further example, fueled in this example means the cylinders are receiving main fuel injections that are used for combustion within the cylinder. As such, unfueled cylinders are not receiving main fuel injections, but the cylinders may receive fuel post injections. For plot 714, the vertical axis indicates whether the decompression mode is on or off. For example, when the decompression mode is on, a decompression device (e.g., decompression device 153 of FIG. 1) is operated to perform decompression engine braking. As a further example, when the decompression mode is off, the decompression device is not operated for decompression engine braking. For plots 716 and 718, the vertical axis shows the position of the VGT and the EGR valve, respectively, from a fully closed position ("closed") to a fully open position ("open"), as labeled.

At time t0, all cylinders are fueled and active (plot 712). The DPF soot load (plot 704) is less than the upper soot load threshold (dashed line 706), indicating that active DPF regeneration is not requested. However, the engine is operated at a relatively high speed (plot 702) and load (not shown), which increases from time t0 to time t1. Because of the high load operation, EGR is not requested, and the EGR valve is fully closed (plot 718). Further, the decompression mode is off (plot 714), as engine braking is not desired, and the VGT is operated with the VGT vanes in the fully open position (plot 716) to prevent engine choke due to the high operating speed. Due to the high operating speed and load, the exhaust system is relatively hot, and the temperature of the DPF increases between time t0 and time t1 (plot 708) until it reaches the threshold DPF temperature (dashed line 709) at time t1. Because the temperature of the DPF has reached the threshold DPF temperature at time t1, the DPF soot load (plot 704) begins to decrease at time t1. Thus, passive DPF regeneration occurs between time t1 and time t2, as the heat generated through engine operation alone raises the temperature of the DPF (plot 708) above the threshold DPF temperature (dashed line 709).

From time t2 to time t3, a duration in time elapses, as indicated by the break in the horizontal axis. The duration in time may be one day or several days, for example, or another period. From time t3 to time t4, all cylinders are fueled, the decompression mode (plot 714) is off, as engine braking is not requested, and the VGT and the EGR valve are each in an open position (plots 716 and 718, respectively). However, after the engine speed (plot 702) decreases between time t3 and time t4, the engine load has also decreased, and conditions for cylinder deactivation are met. In response, half of the engine cylinders are deactivated (plot 712) at time t4. Since fewer cylinders are active, the EGR valve decreases in openness to allow less exhaust gases to recirculate to the cylinders. Additionally, the VGT is moved to a more open position at time t4 to allow more air to flow through the cylinders.

At time t5, the soot load in the DPF (plot 704) increases past the upper soot load threshold (dashed line 706). As such, DPF regeneration is requested at time t5. In response, the EGR valve (plot 718) is fully closed to prevent any fuel from the post injection from recirculating to the cylinders and fouling the intake system, and thus not allowing the fuel from the post injection to reach the DOC to generate exotherms for heating and regenerating the DPF. The VGT (plot 716) moves to a more closed position, increasing the exhaust backpressure and decreasing an exhaust mass flow rate. Further, fuel post injection is performed within a threshold timing range each engine revolution, such as described above with respect to FIGS. 2 and 4. With the changes made to the engine operation, the DPF temperature (plot 708) increases until DPF temperature surpasses the temperature threshold (dashed line 709) for DPF regeneration. Note that the dashed plot 710 shows the potential temperature if the post injection routine (e.g., closing the EGR valve, controlling air flow with the VGT, and providing fuel post injection twice within a four-stroke engine cycle) were not performed to increase the DPF temperature. At time t4, dashed line 710 remains below the temperature threshold and, without closing the EGR valve, closing the VGT, and performing fuel post injection, the DPF would not be able to perform regeneration, as the DPF temperature is below the temperature threshold. At time t7, the soot load (plot 704) reaches the lower soot load threshold (dashed line 707). As such, the DPF is regenerated at time t7, and the fuel post injections are discontinued.

Again, a time lapse occurs from time t7 to time t8, indicated by the break in the horizontal axis, during which the soot load in the DPF builds up. Similar to the first time lapse between time t2 to time t3, one or more days may have passed since the DPF regeneration that occurred from time t3 to time t7.

At time t8, the soot load of the DPF (plot 704) increases past the upper soot load threshold. With the upper soot load threshold surpassed, DPF regeneration is requested. All of the cylinders are fueled (plot 712) due to the high engine load at time t8 (not shown), and the VGT is open at a partially open position (plot 716) due to the high engine load. Further, the EGR valve may be closed (plot 718) due to the high load operation and to prevent the fuel from the post injection from being recirculated. In addition to main fuel injections, one or more cylinder(s) also receive post fuel injections, creating already hot exhaust gases that heat the DPF temperature (plot 708) to above the temperature threshold (dashed line 709).

At time t9, the DPF regeneration is interrupted by an engine braking event. In response to the engine braking event, all of the cylinders are unfueled (plot 712), and the decompression mode (plot 714) is turned on. With the decompression mode on, the intake and exhaust valves are managed by a decompression device (e.g., decompression device 153 shown in FIG. 1) to help slow down the vehicle, an example of which is shown within FIGS. 5 and 6. The VGT (plot 716) is moved from the partially open to the closed position. The closed VGT facilitates braking in addition to the decompression device by increasing the pressure in the cylinders and also reduced the exhaust mass flow rate. Further, the EGR valve is maintained fully closed (plot 718) in response to the engine braking event while DPF regeneration is requested in order to prevent the fuel from the post injection from being recirculated.

As braking occurs and main injection fueling is discontinued in the cylinders, fuel post injection is performed within the threshold timing range each engine revolution, such as described above with respect to FIGS. 3 and 4. As a result, the DPF temperature (plot 708) remains above the threshold temperature (dashed line 709), enabling DPF regeneration to continue even while combustion is discontinued in the engine. If the fuel post injection were not performed, the temperature of the exhaust gases and consequently the DPF temperature (plot 708) would drop, as indicated by the dashed plot 710.

At time t10, the soot load of the DPF decreases below the lower soot load threshold (dashed line 707). As such, DPF regeneration has concluded, and the post injection is discontinued. Further, the EGR valve (plot 718) is moved from a closed position to a partially open position to allow exhaust gases to recirculate back to the braking engine. Since braking is still occurring by time t10, the decompression mode (plot 714) remains on and the VGT position (plot 716) remains closed.

In this way, exhaust temperatures may be increased or maintained during active DPF regeneration while combustion is discontinued in at least one cylinder, such as during engine braking or during a cylinder deactivation condition. Further, by adjusting the air flow through the engine via the decompression device and/or the VGT, the overall amount of post injection fuel may be increased while the post injection quantity per engine revolution per cylinder may be minimized. Further still, by injecting the fuel for the post injections within the two timing ranges of no more than 80 crank angle degrees centered on TDC of each of the compression stroke and the exhaust stroke, oil-in fuel dilution and bore washing may be reduced or avoided. As a result, exhaust temperatures can be increased or maintained during conditions in which exhaust system occurring may occur without undesired effects to the cylinder.

The technical effect of injecting fuel post injections within two timing ranges of no more than 80 crank angle degrees centered on TDC during particulate filter regeneration while at least one cylinder of the engine is unfueled is that a soot load of the particulate filter may be decreased while cylinder wall wetting is reduced.

The disclosure also provides support for a method, comprising: responsive to a request for generating exotherms in an exhaust system of an engine while combustion is discontinued in at least one cylinder of the engine, injecting fuel into a cylinder within a threshold crank angle range around top dead center of a compression stroke of the cylinder and also within the threshold crank angle range around top dead center of an exhaust stroke of the cylinder, the threshold crank angle range extending from no more than 40 crank angle degrees before top dead center to no more than 40 crank angle degrees after top dead center. In a first example of the method, the method further comprises: adjusting an air flow through the engine responsive to the request for generating the exotherms in the exhaust system of the engine. In a second example of the method, optionally including the first example, injecting fuel into the cylinder within the threshold crank angle range around top dead center of the compression stroke of the cylinder and also within the threshold crank angle range around top dead center of the exhaust stroke of the cylinder comprises: determining an amount of fuel to inject based on the adjusted air flow through the engine, determining a first timing for injecting the fuel within the threshold crank angle range around top dead center of the compression stroke and a second timing for injecting the fuel within the threshold crank angle range around top dead center of the exhaust stroke based on a desired air-fuel mixing relative to a desired decreased ignition probability, and injecting the determined amount of fuel at the first timing and at the second timing. In a third example of the method, optionally including one or both of the first and second examples, determining the first timing for injecting the fuel within the threshold crank angle range around top dead center of the compression stroke and the second timing for injecting the fuel within the threshold crank angle range around top dead center of the exhaust stroke based on the desired heat generation relative to the desired air-fuel mixing comprises: setting the first timing and the second timing to be earlier within the threshold crank angle range responsive to the desired air-fuel mixing being greater than the desired decreased ignition probability, and setting the first timing and the second timing to be later within the threshold crank angle range responsive to the desired decreased ignition probability being greater than the desired air-fuel mixing. In a fourth example of the method, optionally including one or more or each of the first through third examples, adjusting the air flow through the engine comprises at least one of adjusting a vane position of a variable geometry turbine to a further closed position and adjusting an intake throttle to a further closed position. In a fifth example of the method, optionally including one or more or each of the first through fourth examples, combustion is discontinued in the at least one cylinder of the engine responsive to an engine braking condition, and adjusting the air flow through the engine comprises operating a decompression device. In a sixth example of the method, optionally including one or more or each of the first through fifth examples, combustion is discontinued in the at least one cylinder of the engine responsive to a cylinder deactivation condition, and adjusting the air flow through the engine comprises maintaining an exhaust valve or an intake valve of each deactivated cylinder open. In a seventh example of the method, optionally including one or more or each of the first through sixth examples, the threshold crank angle range extends from 30 crank angle degrees before top dead center to 30 crank angle degrees after top dead center. In an eighth example of the method, optionally including one or more or each of the first through seventh examples, the request for generating the exotherms in the exhaust system of the engine is responsive to a soot load of a particulate filter positioned in the exhaust system of the engine being greater than a threshold soot load, and the method further comprises fully closing an exhaust gas recirculation (EGR) valve positioned in a passage coupled between the exhaust system of the engine and an intake of the engine in response to the request for generating the exotherms in the exhaust system of the engine.

The disclosure also provides support for a method, comprising: responsive to a request to regenerate a particulate filter while combustion is discontinued in at least one cylinder of an engine: determining a first timing of a first fuel post injection within a first threshold timing range of no more than 80 crank angle degrees and a second timing of a second fuel post injection within a second threshold timing range of no more than 80 crank angle degrees based on a desired exhaust gas condition, the first threshold timing range extending from a compression stroke of a cylinder to a power stroke of the cylinder and the second threshold timing range extending from an exhaust stroke of the cylinder to an intake stroke of the cylinder, and delivering the first fuel post injection to the cylinder at the first timing and the second fuel post injection to the cylinder at the second timing. In a first example of the method, the method further comprises: adjusting an amount of each of the first fuel post injection and the second fuel post injection based on an air flow through the engine. In a second example of the method, optionally including the first example, combustion is discontinued in the at least one cylinder of the engine responsive to a request for engine braking, and the method further comprises adjusting the air flow through the engine via a decompression device responsive to the request for engine braking. In a third example of the method, optionally including one or both of the first and second examples, combustion is discontinued in the at least one cylinder of the engine responsive to a cylinder deactivation condition, and wherein the air flow through the engine is adjusted via a variable geometry turbine during the cylinder deactivation condition. In a fourth example of the method, optionally including one or more or each of the first through third examples, the first timing of the first fuel post injection is earlier within the first threshold timing range and the second timing of the second fuel post injection is earlier within the second threshold timing range when the desired exhaust gas condition is an increased mixing of the fuel with air, and wherein the first timing of the first fuel post injection is later within the first threshold timing range and the second timing of the second fuel post injection is later within the second threshold timing range when the desired exhaust gas condition is decreased ignitability. In a fifth example of the method, optionally including one or more or each of the first through fourth examples, the cylinder receiving the first fuel post injection and the second fuel post injection is included in the at least one cylinder having discontinued combustion. In a sixth example of the method, optionally including one or more or each of the first through fifth examples, the cylinder receiving the first fuel post injection and the second fuel post injection is not included in the at least one cylinder having discontinued combustion.

The disclosure also provides support for a system, comprising: an engine including a plurality of cylinders, and a controller storing executable instructions in non-transitory memory that, when executed, cause the controller to: inject fuel into at least one of the plurality of cylinders each revolution of the engine during a threshold post injection timing range extending from no more than 40 degrees before top dead center to no more than 40 degrees after top dead center while particulate filter regeneration is requested during an engine operating condition where combustion is discontinued. In a first example of the system, the system further comprises: a particulate filter coupled in an exhaust system of the engine, and wherein the particulate filter regeneration is requested responsive to a soot load of the particulate filter being greater than a threshold soot load. In a second example of the system, optionally including the first example, the engine operating condition where combustion is discontinued is one of an engine braking condition and a cylinder deactivation condition. In a third example of the system, optionally including one or both of the first and second examples, to inject the fuel into the at least one of the plurality of cylinders each revolution of the engine during the threshold post injection timing range, the controller includes further instructions stored in the non-transitory memory that, when executed, cause the controller to: set a timing to inject the fuel into the at least one of the plurality of cylinders each revolution of the engine during the threshold post injection timing range to be before top dead center within the threshold post injection timing range as a desired amount of heat production increases, and set the timing to inject the fuel to be after top dead center within the threshold post injection range as a desired amount of mixing increases.

In another representation, a method comprises: responsive to a request for particulate filter regeneration while combustion is discontinued in at least one cylinder of an engine, determining a timing for performing a fuel post injection in the at least one cylinder each revolution of the engine based on a desire for increased mixing relative to a desire for decreased ignitability. In the preceding example, additionally or optionally, the timing for performing the fuel post injection is earlier within a threshold crank angle range when the desire for increased mixing is greater than the desire for decreased ignitability. In one or both of the preceding examples, additionally or optionally, the threshold crank angle range extends from no more than 40 crank angle degrees before top dead center to no more than 40 crank angle degrees after top dead center. In any or all of the preceding examples, additionally or optionally, the threshold crank angle range extends from 30 crank angle degrees before top dead center to 30 crank angle degrees after top dead center. In any or all of the preceding examples, additionally or optionally, the timing for performing the fuel post injection is before top dead center when the desire for increased mixing is greater than the desire for decreased ignitability and after top dead center when the desire for decreased ignitability is greater than the desire for increased mixing. In any or all of the preceding examples, the method additionally or optionally further comprises maintaining a valve of the at least one cylinder open throughout each revolution of the engine responsive to the request for particulate filter regeneration while combustion is discontinued in the at least one cylinder. In any or all of the preceding examples, additionally or optionally, the valve is an intake valve responsive to the desire for increased mixing being greater than the desire for decreased ignitability. In any or all of the preceding examples, additionally or optionally, the valve is an exhaust valve responsive to the desire for decreased ignitability being greater than the desire for increased mixing. In any or all of the preceding examples, the method additionally or optionally further comprises restricting flow through an exhaust turbine responsive to the request for particulate filter regeneration while combustion is discontinued in the at least one cylinder. In any or all of the preceding examples, the method additionally or optionally further comprises fully closing an exhaust gas recirculation valve responsive to the request for particulate filter regeneration while combustion is discontinued in the at least one cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

responsive to a request for generating exotherms in an exhaust system of an engine while combustion is discontinued in at least one cylinder of the engine, injecting fuel into a cylinder within a threshold crank angle range around top dead center of a compression stroke of the cylinder and also within the threshold crank angle range around top dead center of an exhaust stroke of the cylinder, the threshold crank angle range extending from no more than 40 crank angle degrees before top dead center to no more than 40 crank angle degrees after top dead center.

2. The method of claim 1, further comprising:

adjusting an air flow through the engine responsive to the request for generating the exotherms in the exhaust system of the engine.

3. The method of claim 2, wherein injecting fuel into the cylinder within the threshold crank angle range around top dead center of the compression stroke of the cylinder and also within the threshold crank angle range around top dead center of the exhaust stroke of the cylinder comprises:

determining an amount of fuel to inject based on the adjusted air flow through the engine;

determining a first timing for injecting the fuel within the threshold crank angle range around top dead center of the compression stroke and a second timing for injecting the fuel within the threshold crank angle range around top dead center of the exhaust stroke based on a desired air-fuel mixing relative to a desired decreased ignition probability; and injecting the determined amount of fuel at the first timing and at the second timing.

4. The method of claim 3, wherein determining the first timing for injecting the fuel within the threshold crank angle range around top dead center of the compression stroke and the second timing for injecting the fuel within the threshold crank angle range around top dead center of the exhaust stroke based on the desired air-fuel mixing relative to the desired decrease ignition probability comprises:

setting the first timing and the second timing to be earlier within the threshold crank angle range responsive to the desired air-fuel mixing being greater than the desired decreased ignition probability; and setting the first timing and the second timing to be later within the threshold crank angle range responsive to the desired decreased ignition probability being greater than the desired air-fuel mixing.

5. The method of claim 2, wherein adjusting the air flow through the engine comprises at least one of adjusting a vane position of a variable geometry turbine to a further closed position and adjusting an intake throttle to a further closed position.

6. The method of claim 2, wherein combustion is discontinued in the at least one cylinder of the engine responsive to an engine braking condition, and adjusting the air flow through the engine comprises operating a decompression device.

7. The method of claim 2, wherein combustion is discontinued in the at least one cylinder of the engine responsive to a cylinder deactivation condition, and adjusting the air flow through the engine comprises maintaining an exhaust valve or an intake valve of each deactivated cylinder open.

8. The method of claim 1, wherein the threshold crank angle range extends from 30 crank angle degrees before top dead center to 30 crank angle degrees after top dead center.

9. The method of claim 1 wherein the request for generating the exotherms in the exhaust system of the engine is responsive to a soot load of a particulate filter positioned in the exhaust system of the engine being greater than a threshold soot load, and the method further comprises fully closing an exhaust gas recirculation (EGR) valve positioned in a passage coupled between the exhaust system of the engine and an intake of the engine in response to the request for generating the exotherms in the exhaust system of the engine.

* * * * *